United States Patent Office.

FRANK S. MITCHELL, OF PHILADELPHIA, PENNSYLVANIA, ASSIGNOR TO THOMAS J. MARTIN, EDWIN MARTIN, AND WILLIAM L. MARTIN, OF SAME PLACE.

WATERPROOFING FABRIC.

SPECIFICATION forming part of Letters Patent No. 327,813, dated October 6, 1885.

Application filed July 24, 1885. Serial No. 172,558. (No specimens.)

*To all whom it may concern:*

Be it known that I, FRANK S. MITCHELL, a citizen of the United States, residing at Philadelphia, in the county of Philadelphia and State of Pennsylvania, have invented certain new and useful Improvements in Waterproofing Fabrics; and I do declare the following to be a full, clear, and exact description of the invention, such as will enable others skilled in the art to which it appertains to make and use the same.

This invention relates to a new and improved method of waterproofing textile and fibrous material, so as to render it absolutely impermeable and impervious to all moisture; and my process consists of a series of operations wherein certain specified and particular ingredients and chemicals, or their equivalents, are to be used, as will be hereinafter fully set forth and described.

I first take a certain amount of acid—such as oleic, stearic, margaric, or palmitic, or any combination of two or more of these—and saponify it by adding an alkali—as, for instance, caustic soda—together with a sufficient quantity of water. This alkali is to be added until the combination with it is complete and no free oil or acid remains. The saponification is then complete, after which a salt of alumina dissolved in water is to be added. I preferably use sulphate of alumina; but it is evident that any of the various other salts may be used. The combined solution thus made is to be subjected to the action of heat and boiled until the fatty acid and alumina, which will unite during the process, shall have separated from the water. Next drain away the separated liquor or water from the insoluble compound of fatty acid and alumina. Wash this insoluble mass again and again by the addition of water, so as to remove from it any adhering matter which it is not desired to retain. Then repeat the operation of saponification by adding to this insoluble mass a sufficient quantity of water and alkali and boiling it until a soluble substance is again procured.

I have now described the series of steps by which the preparation is made with which the fabrics are to be rendered impervious to water.

The soluble substance, as above described, is treated with water until the liquid becomes of a suitable consistency for use as a bath into which to immerse the articles to be waterproofed. Then immerse the articles or fabrics in this bath, or pass them through it in any convenient and suitable manner. To this end any mechanism proper for the purpose may be employed, or mechanism may be dispensed with altogether and the various articles merely dipped into the liquid. The articles or fabrics are to be passed through this bath a sufficient number of times to allow the material to become thoroughly permeated with it. They are then dried thoroughly and afterward immersed in a strong solution of some soluble metallic salt, preferably salts of alumina. This renders the combination of metallic salt and fatty acid again insoluble; but the insoluble substance is now situated within the fiber of the material being treated.

The feature of my invention just described—viz., that of introducing into the fibers of an article to be waterproofed a substance in a soluble form, and after the article has become thorough permeated therewith passing the same through a bath of sulphate of alumina, which renders the soluble substance insoluble—is of the highest importance, for the waterproofing substance is here incorporated into the texture of the fabric itself, and not merely caused to adhere to the outside surface. There are very many methods of waterproofing in which a paint or varnish is applied to the surface of the fabric. This is oftentimes exceedingly detrimental to the fabric, as it destroys its color and renders it less flexible than before. The varnish is also liable to break and crackle, and the waterproofed qualities of the fabric be impaired, if not totally destroyed; but by my process the material is not injured in the smallest degree. The cloth does not change its color nor lose its flexibility, but retains every good quality formerly possessed, with the additional value of being absolutely impervious to moisture.

Having thus fully described my invention, what I claim as new, and desire to secure by Letters Patent, is—

1. The herein-described process of treating fabrics to render them impervious to moisture, which consists in first saponifying a vegetable acid with an alkali, as caustic soda, then adding a salt of alumina dissolved in water and boiling until the combination of fatty acid and alumina separates from the water, washing this insoluble compound, then rendering it again soluble by boiling with an alkali, which affords a bath into which the fabrics are to be immersed, then dried, and finally passed through a second bath consisting of salts of alumina, substantially as and for the purposes set forth.

2. The herein-described process of treating fabrics to render them impervious to moisture, which consists in immersing the fibrous material in an aqueous solution of alkali, fatty acid, and a salt of alumina, then drying and afterward passing it through a bath consisting of a strong solution of a metallic salt, substantially as shown and described.

3. A process of waterproofing fabrics, which consists in introducing into the fibers of the fabric a substance in a soluble form, consisting of a fatty acid, aluminous salt, and an alkali, and after the fabric has become thoroughly permeated therewith passing the same through a bath of sulphate of alumina, which renders the soluble substance insoluble, substantially as shown and described.

In testimony whereof I affix my signature in presence of two witnesses.

FRANK S. MITCHELL.

Witnesses:
EUGENE ZIEGLER,
JACOB ZIEGLER.